Figure 1:
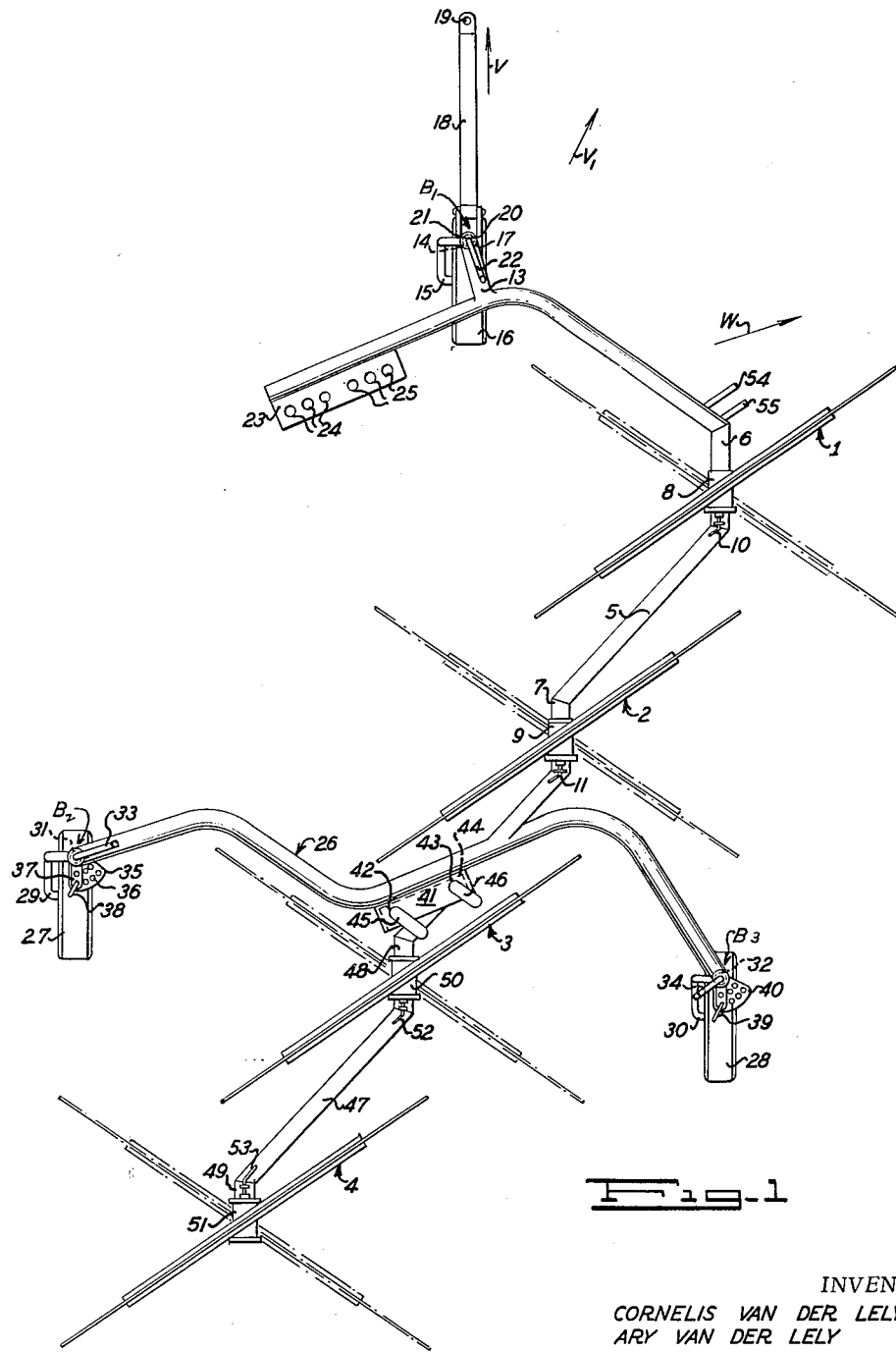

INVENTORS
CORNELIS VAN DER LELY
ARY VAN DER LELY

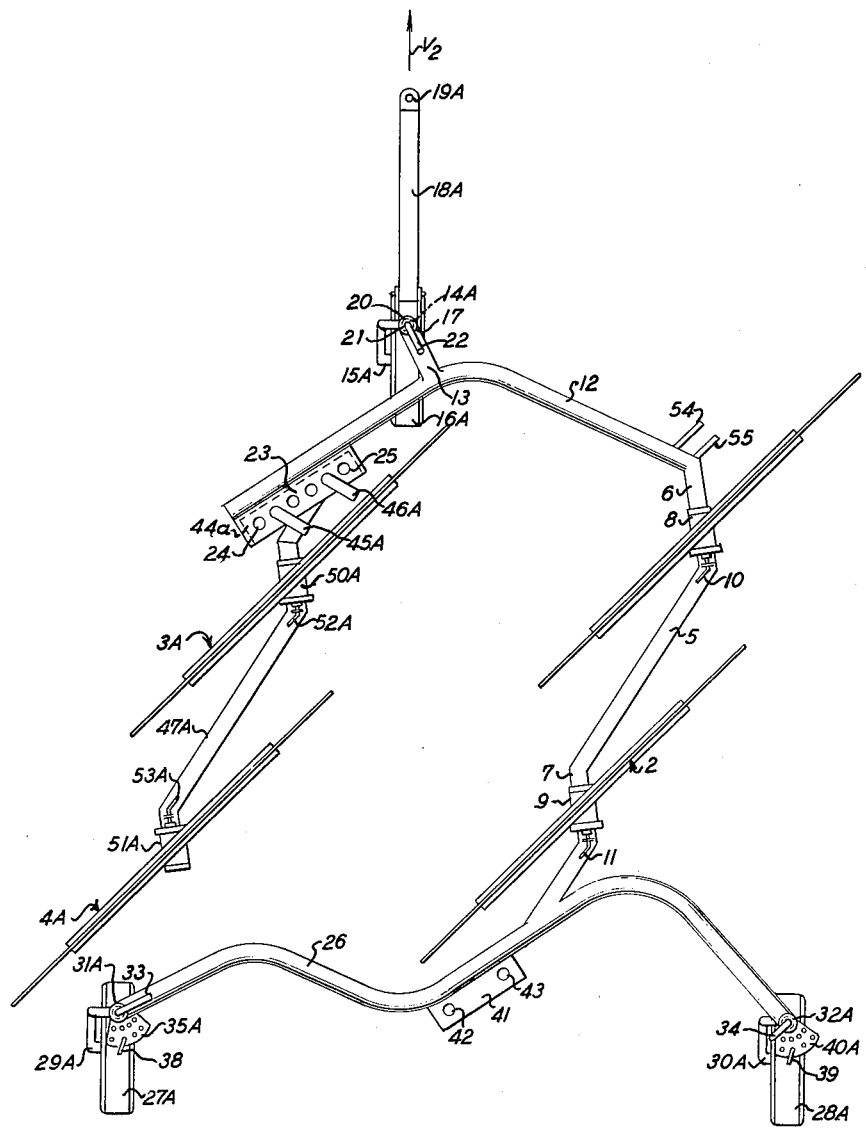

United States Patent Office 3,006,132
Patented Oct. 31, 1961

3,006,132
DEVICES FOR LATERALLY DISPLACING MATERIAL LYING ON THE GROUND
Cornelis van der Lely and Ary van der Lely, Maasland, Netherlands, assignors to C. van der Lely N.V., Maasland, Netherlands, a limited company of the Netherlands
Filed Sept. 30, 1957, Ser. No. 686,935
Claims priority, application Netherlands Sept. 29, 1956
6 Claims. (Cl. 56—370)

This invention relates to devices for laterally displacing crop or the like material lying on the ground, the devices being of the kind having a plurality of rake wheels, which are divided into at least two groups, each group comprising at least two rake wheels.

Devices of the kind set forth are generally known, but they have the disadvantage that, when the device is converted from one working position into another (by displacing one group of rake wheels relative to another group), difficulties arise on account of the fact that, when one group is disengaged, the other group tends to tilt, so that the group which has been disengaged can only be re-positioned with difficulty; moreover these devices sometimes have the disadvantage that in at least one working position the wheel base is rather small.

It is an object of the invention to obviate these disadvantages.

According to the invention, there is provided a device of the kind set forth, wherein a first group is carried by a frame which is supported at at least three points, whereas a second group of rake wheels, in common with a frame associated therewith, is displaceable with respect to the first group and can be connected with the first group in at least two positions, in both of which the frame of the second group is connected at one end with the first group.

With such a device, it is thus possible, in order to convert the device from one working position into another position, e.g. from a side delivery rake into a swath turner, to disengage a group of rake wheels readily from the frame and to connect it again to the frame at a different location, because the frame, being supported at at least three points, is stable.

Another advantage of the present device over the known devices is that even on sloping ground the device can work satisfactorily in both working positions without skidding sideways. The arrangement of the device is preferably such that when swath turning there are practically no frame parts projecting beyond the connecting lines of the points of ground contact of ground wheels of the device, and none of the ground wheels ride over the crop. Preferably, the second group can be readily disengaged from the frame and re-connected therewith by removing and re-introducing two locking pins respectively. This has the advantage in that the conversion of the device from the first working position into the second working position requires minimum time.

Preferably, the means to which the frame member can be attached at the second location is so constructed that the distance between the rake wheels of the first group and those of the second group in the second working position can be varied, so that the distance between groups of rake wheels can be adapted to the distance between the swaths to be worked.

The rake wheels of the first group are preferably connected to one another by a part of the frame, which passes through the hubs of the two rake wheels and which extends from the rear side of one rake wheel to the front side of the other rake wheel, the rake wheels of the second group being similarly connected by a frame member and being adapted to be arranged in at least two positions with respect to the rake wheels of the first group. This results in the device having a simple and cheap frame structure.

It is important that the device should be supported at three points, preferably by three ground wheels, which may be so disposed that in the first working position, two ground wheels are located in front of the second group of rake wheels, and in the second working position, two ground wheels are located behind all the rake wheels, so that they run on clean ground in the second working position. This has the advantage that, in the second working position in which the device constitutes a swath turner, the turned crop, which is delivered sideways by the rake wheels, is not flattened by the ground wheels, so that drying is appreciably facilitated.

For a better understanding of the invention, and to show how the same may be carried into effect, reference will now be made to the accompanying drawings, in which:

FIGURE 1 is a plan view of a device for laterally displacing material lying on the ground, the device being shown in a working position in which it can operate as a side delivery rake, and FIGURE 2 is a plan view of the device shown in FIGURE 1, the device being shown in a working position in which it can operate as a swath turner.

Referring to FIGURE 1, the device has four rake wheels 1, 2, 3 and 4, of which the rake wheels 1 and 2 constitute a first group and the rake wheels 3 and 4 a second group. The rake wheels 1 and 2 are connected to one another by a frame member formed as a beam 5, which passes through the hubs of the rake wheels, cranked portions 6 and 7 of the frame member 5 constituting shafts for bearings 8 and 9, on which the rake wheels 1 and 2 respectively are so rotatably mounted that the axes of rotation of the rake wheels 1 and 2 are at angles to the shaft portions 6 and 7. The bearings 8 and 9 are prevented from rotating about the shafts 6 and 7 by means of locking pins 10 and 11 which pass through the bearings and engage shafts 6 and 7. A curved transverse beam or frame member 12 is secured to the front of the beam 5, and an arm 13 is secured to the front of the beam 12. The free end of the arm 13 carries a vertical shaft 14 in a bearing B1, which supports a horizontal axle 15, about which a ground wheel 16 is rotatable (since beam 12 is connected to frame member 5, ground wheel 16 can be considered as being coupled to frame beam 5). The shaft 14 and the axle 15 are so arranged that the wheel 16 is a caster wheel, and the shaft 14 is rotatable in a bearing 17, which is rigidly secured to the arm 13.

A draw-bar 18 is connected to the shaft 14, and is formed with a hole 19, so that the device can be moved by connecting the draw-bar 18 to a prime mover. The top end of the bearing 17 is closed by a plate 20 having a screw-threaded hole, through which a screw-threaded pin 21 passes, the pin 21 being formed with a crank 22, by means of which the pin 21 can be turned. The bottom end of the pin 21 bears on the top end of the shaft 14. The curved arm 12 also carries two plates 23, one of which (visible in the drawing) lies over the other, and each of which is formed with two series of holes 24 and 25, the two plates 23 being spaced apart from one another in the vertical direction.

At its rear end, the beam 5 is connected to a rear transverse beam or frame member 26, to which ground wheels 27 and 28 are connected, the wheel 27 being rotatable about a horizontal axle 29 and a vertical shaft 31, and the wheel 28 being rotatable about a horizontal axle 30 and about a vertical shaft 32 (since beam 26 is coupled to frame beam 5, wheels 27 and 28 can be considered as being coupled to frame beam 5). The shafts 31 and 32 are connected to the beam 26 by bearings B2 and B3 in the same manner in which the shaft 14 is connected to the arm 13, the cranks over the shafts 31 and 32 being designated by 33 and 34. The shaft 31 carries a sector-shaped plate 35, which is formed with a plurality of holes 36 and an arm 37 is connected to the bearing B2 in which the shaft 31 is rotatable, there being a locking pin 38 for securing the arm 37 relative to the plate 35 by inserting the locking pin 38 into one of the holes 36, so that the ground wheel 27 can be prevented from rotating about the shaft 31. The ground wheel 28 is also prevented from rotating about the shaft 32 in the same manner as described for the ground wheel 27 by the insertion of a locking pin 39 into an apertured plate 40, which is secured to the shaft 32.

Two plates 41 of the same shape are secured to the beam 26, one plate (visible in the drawing) lying over the other, and the plates being formed with holes 42 and 43. A plate 44, having two holes adapted to register with the holes 42 and 43 is sandwiched between the plates 41, the plate 44 being secured between the plates 41 by means of locking pins 45 and 46, which pass through the holes 42 and 43. The plate 44 fits between the plates 41 in a manner such that it is not capable of moving in the vertical direction. A beam 47 is secured to the plate 44, and is provided with two cranked portions 48 and 49, which constitute shafts for bearings 50 and 51, the bearings 50 and 51 being prevented from rotating about the shafts 48 and 49 by locking pins 52 and 53. The rake wheels 3 and 4 are connected to the bearings 50 and 51, the axis of rotation of each rake wheel being at an angle to its associated shaft 48 or 49.

In the operation of the device, the device is moved in the direction of the arrow V, and the rake wheels 1, 2, 3 and 4 will be rotated by coming into contact with the ground owing to their oblique position relative to the direction of travel. The rake wheels thus displace laterally the crop engaged by them and deposit it at the side of the rake wheel 4. In this working position the wheels 27 and 28 are prevented from rotating about the shafts 31 and 32, so that these wheels are capable of withstanding the lateral forces exerted on the device during movement.

In order to transport the device, the rake wheels can be raised from the ground by turning the cranks 22, 33 and 34, so that the vertical shafts 14, 31 and 32 are pushed downwards in their bearings, whereby the frame of the device and the rake wheels are moved upwards as a whole, the rake wheels being thus lifted from the ground. In order to reduce the width of the device for transport purposes, the device can be drawn in the direction of the arrow $V_1$, and the positions of the ground wheels 27 and 28 must be altered accordingly.

The device may be converted into a different working position, in which the device constitutes a tedder and each rake wheel operates on an individual strip of ground. This position may be obtained by releasing the locking pins 10, 11, 52 and 53 and by turning the bearings 8, 9, 50 and 51 through 180° about their shafts, after which the locking pins 10, 11, 52 and 53 are replaced. The rake wheels then occupy the positions shown in broken lines in FIGURE 1, and, when the rake wheels are in these positions, the device is moved in the direction of the arrow W. However, to effect such movement, the draw-bar 18 is released from the shaft 14, and is fixed between lugs 54 and 55, which are provided on the beam 12, the draw-bar 18 being then rigidly connected in a horizontal direction to the lugs 54 and 55.

Referring now to FIGURE 2, the device shown in FIGURE 1 is shown in a different working position in which it can operate as a swath turner. In FIGURE 2 the same reference numerals have been employed as in FIGURE 1, but the reference numerals of those parts which occupy a different position are differentiated by the suffix "A." In this position the group of rake wheels 3 and 4 is disengaged from the transverse beam 26 by removing the locking pins 45 and 46, this group being positioned on the curved beam 12 by introducing the plate 44 between the plates 23 and by inserting the locking pins 45 and 46 into one of the holes 24 and 25 respectively. In the position shown in FIGURE 2, in which the device travels in the direction of the arrow $V_2$, the groups of rake wheels 1, 2, and 3A, 4A will each work separate strips of ground, the crop displaced laterally by the rake wheels 1 and 2 remaining spaced apart from the crop displaced laterally by the rake wheels 3A and 4A, each group of rake wheels forming or turning a swath. The rake wheels of the two groups are located in this position substantially within the wheel base formed by the ground wheels 16, 27 and 28, so that a satisfactory adaptation of the rake wheels to any unevenness of the ground can be ensured, and the device is stable.

The distance between the groups of rake wheels 1, 2 and 3A, 4A may be varied by inserting the locking pins 45 and 46 selectively into the holes 24 and 25 so that the distance between the groups of rake wheels can be adapted to the distance between the swaths to be turned. The ground wheels 27A and 28A are also locked in this position of the device against rotation about the shafts 31A and 32A, the positions of the wheels 27A and 28A being adapted to the direction of travel $V_2$.

In order to lighten the group of rake wheels 3 and 4 to facilitate the displacing of the group, the rake wheel 4 and its associated bearing 51 can first be detached from the shaft 49 and can then be replaced after the rake wheel 3 and the beam 47 have been attached to the beam 12.

What we claim is:
1. A device for displacing material lying on the ground comprising a frame member, at least three ground wheels operatively associated with and supporting said frame member, a transverse beam attached to said frame member, a first group of rake wheels directly connected to said frame member and operatively arranged thereon in side delivery relation, a beam separate from said frame member, a second group of rake wheels directly coupled to the second said beam and operatively arranged thereon in side delivery relation, and means operatively associated with said transverse beam and the second said beam and detachably supporting the second said beam on said frame member with said groups aligned in swath turning relationship.

2. A device as claimed in claim 1 wherein one of said ground wheels is coupled to said transverse beam.

3. A device as claimed in claim 2 comprising a transverse beam attached to said frame member and spaced from the first said transverse beam, the other of said ground wheels being connected to the second said transverse beam.

4. A device as claimed in claim 1 comprising a plate on said transverse beam, said plate being provided with a series of holes, a plate on the second said beam and provided with holes, said plates being juxtaposed with holes in the one plate being aligned with holes in the other plate, and locking pins inserted through the aligned holes whereby the second said beam is connected to said transverse beam.

5. A device as claimed in claim 1 comprising a rear transverse beam on said frame member, and means on said rear transverse beam and adapted to connect the second said beam thereto with said second group of rake wheels aligned with the first group in side delivery relation.

6. A device as claimed in claim 1 wherein said frame member extends through the rake wheels of the first group, said device further comprising bearings rotatable on said frame member and supporting the rake wheels of said first group.

References Cited in the file of this patent
FOREIGN PATENTS

| | | |
|---|---|---|
| 73,684 | Denmark | Jan. 7, 1952 |
| 1,081,746 | France | June 9, 1954 |
| 1,084,872 | France | July 13, 1954 |
| 725,213 | Great Britain | Mar. 2, 1955 |
| 1,104,448 | France | June 15, 1955 |